May 16, 1950     H. V. REED     2,507,646
CLUTCH PLATE
Filed Jan. 2, 1947
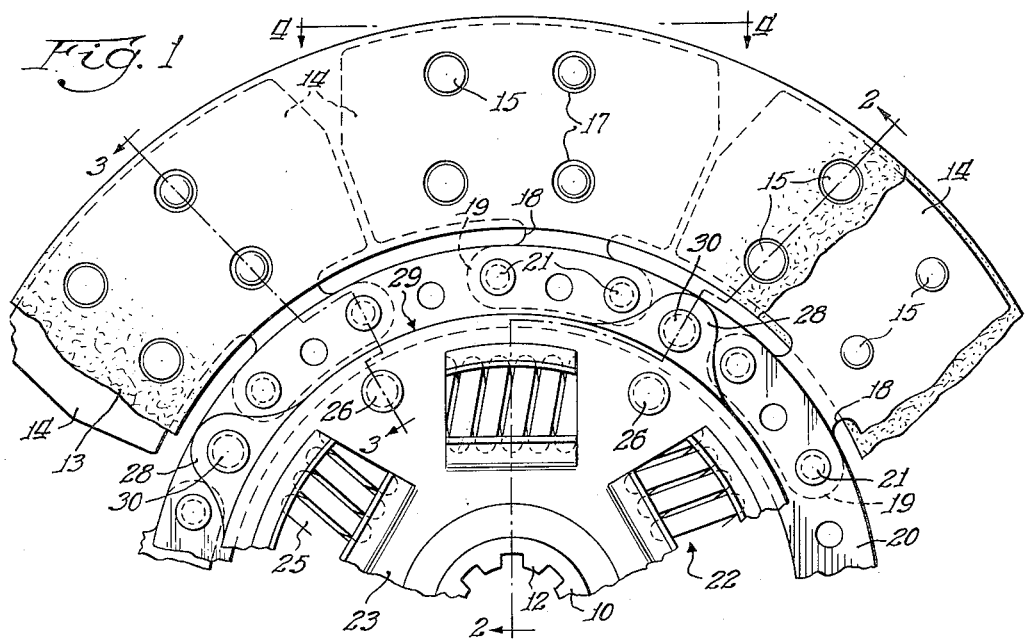
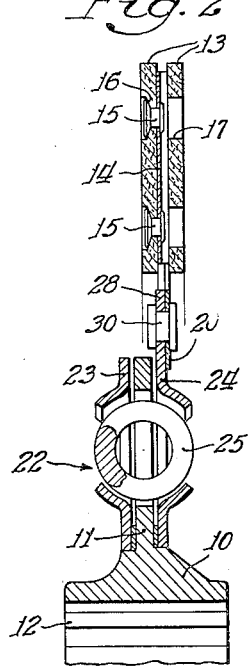
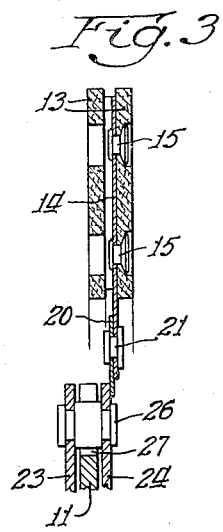
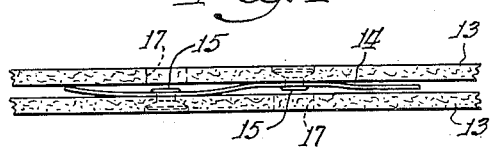
Inventor:
Harold V. Reed Patented May 16, 1950

2,507,646

UNITED STATES PATENT OFFICE 2,507,646

CLUTCH PLATE

Harold V. Reed, Chicago, Ill., assignor to Borg-Warner Corporation, Chicago, Ill., a corporation of Illinois Application January 2, 1947, Serial No. 719,769

9 Claims. (Cl. 192—107)

This invention relates to improvements in friction clutch plates such as used in clutch assemblies for coupling driving and driven members in a motor vehicle.

These improvements are particularly directed to the provision, in a driven clutch plate assembly, of a friction facing mounting structure which is characterized by being inherently yieldable. Further, it is contemplated that such facing mounting structure may be separately assembled as a unit so that it is capable of ready attachment in its unitary form to a member of the hub portion or inner region of a clutch plate for effecting a driving connection between the facings and the hub.

A primary object of the present invention is to improve the construction and operation of friction clutch plates such as contemplated herein, whereby to increase the efficiency, operation and dependability of said clutch plates.

Another primary object resides in providing a clutch plate of the friction type wherein the facing material is carried by a plurality of yieldable cushions which are separate from and are secured at their radially inner regions to a thin springy ring, which ring in turn is suitably attached to the rim portion of a member carried by the hub.

In the present arrangement a hub supported non-yielding member, such as a disc or washer, has its periphery recessed and the narrow yieldable ring which supports the cushions is attached to this member in spanning relation across said recesses. Differently stated, a non-yielding central disc or washer has a plurality of outwardly projecting radial ears to which said narrow spring ring is secured.

Advantageously, the cushions preferably have inwardly extending reduced necks which terminate in circumferentially elongated feet, the latter being attached to the narrow ring at the recess-spanning regions thereof; in other words, between the ears of the non-yielding central disc. The ring and cushions provide an inherently yieldable mounting structure for the facings, and said structure is capable of being assembled as a unit, preferably with the facings thereon and then riveted to the peripheral region of a hub carried member.

The facing mounting structure, comprised of the narrow ring and cushions, is formed of light weight thin yieldable sheet steel, such metal having the inherent yieldability which characterizes clock-spring steel and it is materially thinner than the metal from which the central disc member is made. A metal which is well adapted for use as a cushion of the character herein contemplated is known commercially as pre-tempered clock spring steel, Rockwell 40-44, "C" scale, and it is preferred to form the narrow ring as well as the separate cushions from this metal. Thus the outer region or zone of the clutch plate contemplated herein is materially reduced in weight with the result that there is a minimum of rotational inertia present in this clutch plate during idling movement of the member which carries the clutch plate.

Additional objects, aims and advantages of the invention contemplated herein will be apparent to persons skilled in the art after the construction and operation of the improved friction clutch plate is understood from the within description. It is preferred to accomplish these numerous objects, and to practice the invention, in substantially the manner hereinafter fully described and as more particularly pointed out in the appended claims. Reference is now made to the accompanying drawings forming a part of this specification.

In the drawings:

Fig. 1 is a fragmentary face elevation of a friction clutch plate embodying the present improvements.

Fig. 2 is a transverse sectional view taken along the plane of line 2—2 on Fig. 1.

Fig. 3 is another transverse sectional view taken along the plane of line 3—3 on Fig. 1.

Fig. 4 is an edge view of a peripheral portion of the clutch plate as viewed in the plane of line 4—4 at the top of Fig. 1.

The drawings are to be understood as being somewhat of a schematic character for the purpose of disclosing a typical or preferred embodiment of the improved clutch plate contemplated herein, and in these drawings the same reference characters identify like or similar parts in the different views.

The friction clutch plate herein shown comprises a central hub 10 having a radially extending flange 11, said hub being centrally bored and provided with splines 12 which adapt the clutch assembly for sliding axial movement on the splined portion of a rotatable shaft, not shown.

The friction facings 13, 13, are preferably two annular flat rings which are spaced axially from each other and define at least a portion of the annular outer zone or region of the clutch plate assembly. These facings, which are of the usual friction material, are adapted to be packed between the flywheel and an axially movable pressure plate for effecting clutch engagement, and said facing rings are maintained in the outer region of the assembly and in yieldably spaced relation to each other by means of a novel supporting structure which will now be described.

The facing mounting structure herein shown by way of example, preferably comprises a plurality of cushion members 14 which may be peripherally elongated as best seen in Fig. 1, and they are of a generally rectangular shape to provide an approximately continuous cushion between the facings 13, 13. The major portions of these cushions, which are interposed between the facings 13, 13, have a wavy form as seen in Fig. 4 with the crests of the waves in contact with the respective facing rings. These contacting parts of the cushions and facings are secured together by rivets 15 having their heads set in counterbored holes 16 in the respective facings, and the portions of each facing opposite a rivet is provided with an aperture 17 to accommodate the upset ends of the rivets.

The inner regions of the cushions have reduced neck portions 18 extending radially inward and terminating in elongated feet 19 as clearly seen in Fig. 1. The feet 19 of the cushions are assembled with an annular member such as a thin narrow ring 20 to which the feet are anchored by rivets 21.

From the foregoing, it will be apparent the mounting structure for supporting the friction facings is of a composite character which is adapted to be assembled as a complete unit for the convenient mounting of the facings on a suitable portion of the hub unit 22.

In addition to the hub and flange, the hub unit 22 comprises an annular washer or retainer plate 23 mounted on the hub 10 at one side of the flange 11 and a similar annular washer or retainer plate 24 is mounted on the other side of hub flange 11 as shown in Fig. 2. These washers 23 and 24 and the hub flange 11 all have a plurality of aligned apertures or windows which are adapted to receive a plurality of helical springs 25 for the purpose of effecting a torsional vibration dampener connection of the well-known type between the hub and the facing mounting structure. The two retainer washers 23 and 24 are tied together and maintained in assembly by means of spool pins 26, the central barrels of which are positioned in marginal recesses 27 in hub flange 11 to permit relative rotative movement between these assembled members and the hub flange 11.

The outer region or periphery of retainer washer 24 has a plurality of radially projecting ears 28 that are spaced apart annually so that peripherally elongated well defined recesses, indicated by the arrow 29 are provided between said ears. Holes are made in ears 28 and the narrow ring portion 20 of the facing mounting structure is anchored to these ears 28 by rivets 30, substantially as clearly shown in Figs. 1 and 2. The narrow thin metal ring 20 of the mounting assembly is thus positioned in spanning relation to the recesses 29 at the margin of the retainer washer 24. It will be noted that this arrangement is such that the feet 19 of the cushions are located and secured to narrow ring 20 between the ears 28 where they are in the regions of said ring 20 where the latter spans the recesses 29, all as clearly shown in Fig. 1.

The retainer washers 23 and 24 are of heavy steel and are non-yielding, whereas the composite facing mounting structure is made of thin sheet steel characterized by its yieldability which is comparable with and may be the type of metal known as pre-tempered clock-spring steel, Rockwell 40-44, "C" scale. The cushions and the narrow ring are of a gauge of this pre-tempered clock-spring steel within the range of .022 to .027 gauge, preferably .025 gauge. As before stated, the mounting structure contemplated herein is adapted to be assembled as a composite unit either with or without the annular friction facings thereon, and as a unit the same may be readily attached to the retainer washer 24 in the manner described.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A friction clutch plate assembly comprising a hub having a radial flange; axially spaced annular friction facings defining the outer region of the clutch plate assembly in spaced relation to said hub flange; a non-yielding central plate carried by said hub unit alongside said flange, said central plate and hub together defining the inner region of the clutch plate assembly in spaced relation to said annular facings; spaced ears on the periphery of said central plate projecting radially outward therefrom into the space between said inner and outer regions; a narrow ring secured to said ears, said ring being formed from thin yieldable sheet steel of materially less thickness than said plate; and a plurality of separate cushion members secured to and supporting said annular friction facings from said narrow ring; each cushion member comprising an elongated circumferentially waved body portion interposed between and separating said facings for effecting relative axial yieldability of said facings under clutch operation; a narrow neck portion projecting radially inward from the inner margin of said body portion; and a circumferentially elongated foot portion at the inner end of said neck portion, said foot portion overlying said narrow yieldable metal ring and secured thereto in a region of said ring between the spaced ears of said central plate, each cushion member being particularly characterized by having its body, neck and foot portions formed integral from thin yieldable sheet steel of approximately the same gauge as said narrow ring.

2. A friction clutch plate assembly comprising a hub having a radial flange; a pair of axially spaced annular friction facings defining at least a portion of the outer region of the clutch plate assembly; a non-yielding central plate carried by said hub alongside said flange and having portions extending radially outward beyond the periphery of said hub flange, said central plate and hub as a unit defining the inner region of the clutch plate assembly spaced from the outer region; a narrow ring secured to the periphery of said central plate and extending towards said facings, said ring being formed from thin yieldable sheet steel; and a plurality of separate cushion members supporting said annular friction facings on said thin narrow ring; each cushion member comprising an elongated circumferentially waved body portion interposed between and separating said facings for effecting relative axial yieldability of said facings under clutch operation; and means for attaching the body portions of said cushions to said narrow yieldable ring independently of said non-yielding central plate, said cushion members being particularly characterized by being separately formed from thin yieldable sheet steel of approximately the same gauge as said narrow ring.

3. In a friction clutch plate assembly, a hub having a radial flange; a pair of annular friction facings spaced outwardly of said hub and flange; a non-yielding disc carried by said hub, the periphery of said disc having portions extending radially beyond the periphery of said hub flange and being spaced inward from said friction facings; a thin narrow metal ring of less thickness than said disc and having the yieldable characteristics of clock-spring sheet steel, said narrow ring secured to peripheral portions of said disc; and a plurality of separate cushions each carried by said thin narrow ring independent of said non-yielding disc, said cushions formed of thin yieldable sheet steel and being interposed between and secured to said friction facings for effecting relative axial yieldability of said facings during clutch operation.

4. In a friction clutch plate assembly, a hub having a radial flange; a pair of annular friction facings spaced outwardly of said hub and flange; a non-yielding disc carried by said hub and having portions extending radially outward from the periphery of said hub flange, the periphery of said disc being spaced from said friction facings and having a plurality of recesses in its margin between said radial portions, a thin narrow ring spanning said recesses, said narrow ring having less thickness than said disc and secured to said radial portions of said disc; and a plurality of separate cushions each carried by said thin narrow ring, said cushions formed of thin spring sheet steel and being interposed between and secured to said friction facings for effecting relative axial yieldability of said facings during clutch operation.

5. In a friction clutch plate assembly, a hub having a radial flange; a pair of annular friction facings spaced outwardly of said hub and flange; a non-yielding disc carried by said hub, the periphery of said disc being spaced from said friction facings and having radially projecting ears; a thin narrow ring of less thickness than said disc secured to said ears; and a plurality of separate cushions each secured to said thin narrow ring in the regions thereof between said ears, said cushions formed of thin spring sheet steel and being interposed between and secured to said friction facings for effecting relative axial yieldability of said facings during clutch operation.

6. In a friction clutch plate assembly, a hub having a radial flange; a non-yielding disc carried by said hub and extending beyond said flange, said disc having portions projecting beyond its periphery; a yieldable facing mounting structure carried by said disc, said mounting structure comprising a narrow ring of thin yieldable sheet steel secured to the projecting peripheral portions of said disc; a plurality of structurally separate transversely yieldable cushions each secured to said thin narrow spring ring, said cushions being formed of thin spring sheet steel; and annular friction facings carried on opposite sides of said cushions, said mounting structure characterized by its yieldability whereby to effect relative axial yieldability of said facings during clutch operation.

7. A friction clutch plate comprising, a hub having a radial flange; axially spaced friction facings of annular form defining an outer region of clutch plate spaced from said hub flange; a heavy non-yielding central plate alongside said flange and operatively connected thereto, said plate having radially projecting ears; and a facing mounting structure carried by said plate, said mounting structure being characterized by its lightness and yieldability, and comprising a narrow ring having approximately the radial width of said ears and riveted thereto; and a plurality of separately formed cushion members secured to and supporting said facings from said ring, each cushion member integrally embracing an elongated wavy body portion lying between said facings, a narrow neck extending inward toward said ring, and elongated feet overlying and riveted to said ring between said ears; said cushion members and narrow ring together providing a facing supporting structure which is characterized by being formed wholly of thin yieldable sheet steel of a gauge approximately .025, whereby axial yieldability of said friction facings during clutch operation is effected.

8. In a friction clutch plate assembly, a hub; a pair of annular friction facings spaced radially outward from said hub; a wide non-yielding disc separate from but operatively connected to said hub, the outer periphery of said disc being spaced inwardly from said friction facings; carrier means defined by a narrow annular band of yieldable sheet metal projecting radially outward from the periphery of said disc toward said friction facings; means attaching said yieldable band at spaced intervals on the periphery of said disc; and a plurality of separate spring metal cushions interposed between and attached to said friction facings for effecting relative axial movement of said facings during clutch packing pressure, said cushions having radially inward extending portions overlying said yieldable band and secured thereto between the band attaching means.

9. In a friction clutch plate assembly, a hub having a radial flange; a pair of annular friction facings spaced radially outward from said hub flange; a wide non-yielding disc carried by said hub alongside said flange and operatively connected thereto, spaced portions of said disc projecting radially outward beyond the periphery of said flange and spaced inwardly from said friction facings; a narrow annular band of yieldable sheet metal projecting radially outward from the periphery of said disc towards said friction facings; means attaching said yieldable band to said spaced outward portions of said disc; and a plurality of separate spring metal cushions interposed between and attached to said friction facings for effecting relative axial movement of said facings during clutch packing pressure, said cushions having radially inward extending portions overlying said yieldable band and secured thereto between the spaced outer portions of said disc.

HAROLD V. REED.

REFERENCES CITED

The following references are of record in the file of this patent:

UNITED STATES PATENTS

| Number | Name | Date |
|---|---|---|
| 2,256,709 | Geyer | Sept. 23, 1941 |
| 2,256,713 | Hunt | Sept. 23, 1941 |
| 2,283,112 | Wemp | May 12, 1942 |
| 2,391,495 | Wemp | Dec. 25, 1945 |

FOREIGN PATENTS

| Number | Country | Date |
|---|---|---|
| 512,009 | Great Britain | Aug. 28, 1939 |